March 18, 1958
J. LAZARUS ET AL
2,826,761
SANITARY EQUIPMENT ADAPTED TO BE ASSOCIATED
WITH A LAVATORY PEDESTAL
Filed Jan. 10, 1955
2 Sheets-Sheet 1
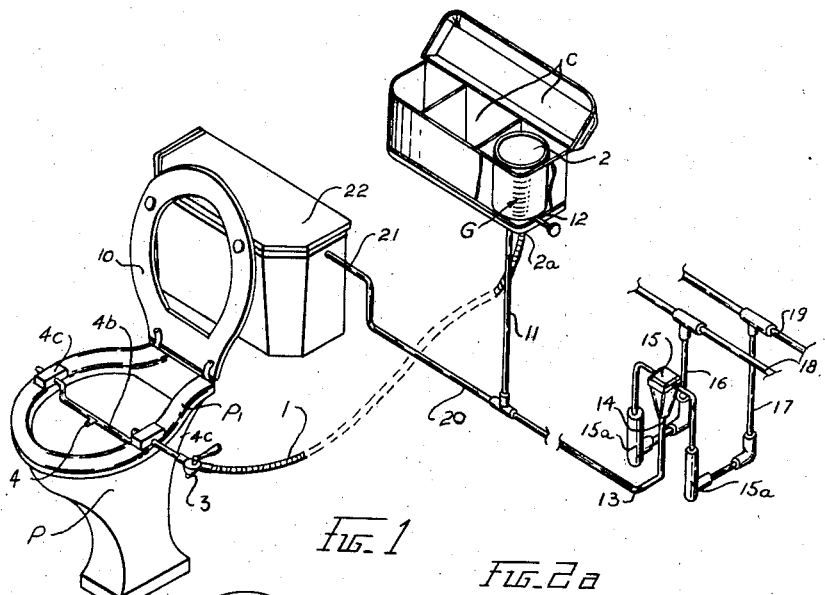
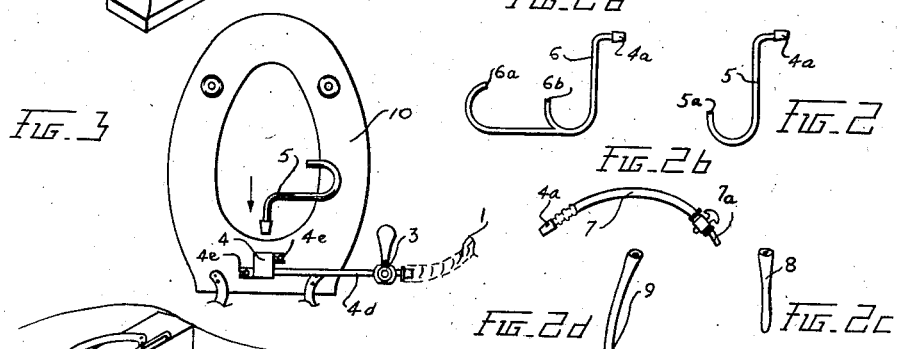
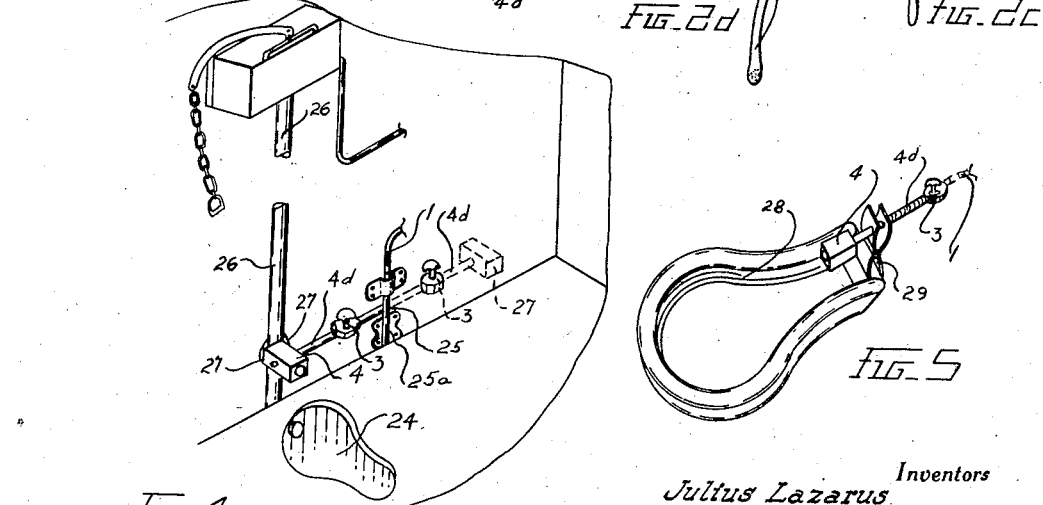
Inventors
Julius Lazarus
George Montague Jenks
By
Webster & Webster
Attorneys

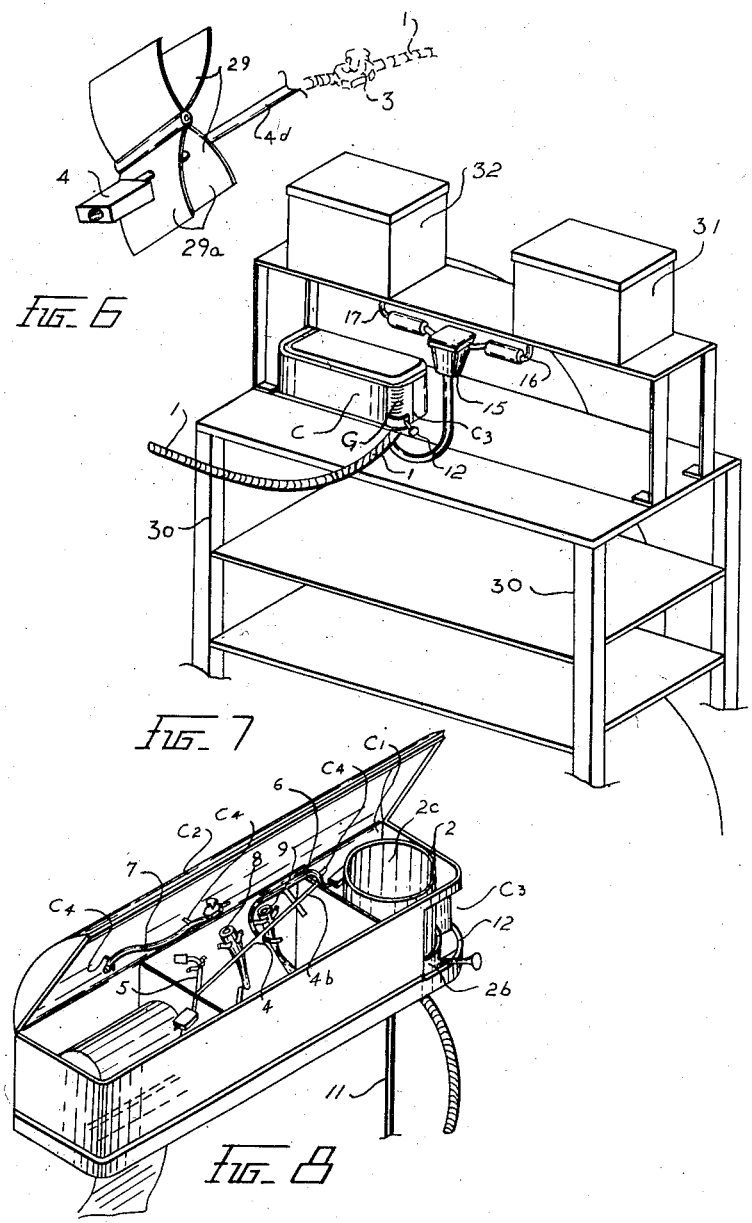

United States Patent Office 2,826,761
Patented Mar. 18, 1958

2,826,761

SANITARY EQUIPMENT ADAPTED TO BE ASSOCIATED WITH A LAVATORY PEDESTAL

Julius Lazarus and George Montague Jenks, Johannesburg, Transvaal, Union of South Africa Application January 10, 1955, Serial No. 480,984

4 Claims. (Cl. 4—7)

This invention relates to sanitary apparatus enabling a lavatory pedestal or bowl, or its equivalent, such as a commode or bed-pan as used in the sick-room or hospitals, or so-called "squat-pans" as used by Asiatics and others, to be put readily and conveniently when desired to additional body-cleansing purposes, namely, as an ablutionary apparatus for the nether parts of the body by which external cleansing and internal douching, irrigation and enema treatments may be performed expeditiously and conveniently.

Although the invention provides, inter alia, improvements affecting the provision, already known, per se, of a water-supply union, socket, nipple or the like located in a rear position with respect to a pedestal bowl in such a way that suitably constructed and configurated nozzles, nozzled pipes, hose or the like or other fittings may be attached when required to the union or the like for their use within the confines of the bowl, it is primarily concerned with the manner and means of serving such union or the like with water under suitable and convenient control as to quantity, pressure, temperature and, when required, detergent, medicine or antiseptic content, with the particular objects of providing the necessary apparatus in forms convenient to install permanently or semi-permanently, or to transport from place to place according to the circumstances, as well as being convenient and reliable in use and tidy in appearance at all times.

According to the invention, in apparatus of the kind and for the purposes above described, there is provided for the service of water to the aforesaid union, nipple, socket or like suitably associated permanently or temporarily with the pedestal bowl or its equivalent, a cabinet or the equivalent installed, or adapted to be installed in or moved into position, within easy access of the bowl or the equivalent and containing, inter alia, storage space within the cabinet for loose nozzles and like equipment when not in use, and also a water-supply vessel adapted for gravity discharge through a suitable supply pipe to the bowl union or the like, and means for charging said vessel with a desired quantity of water at a desired temperature, such means including a water inlet pipe leading to said vessel from thermostatically controlled mixer valve means fed suitably with hot and with cold water.

More particularly, the mixer valve means outlet may preferably be connected both with the water-supply vessel and with a flushing cistern serving the bowl or the like or with an equivalent readily dischargeable tank whereby water leaving the mixer valve means at insufficient temperature for the requirements of the water-supply vessel may be easily disposed of as a preliminary to admitting water to said vessel at suitable temperature for gravitationally serving the union, nipple, socket or the like associated with the bowl or the like, and any of the ablutionary nozzles or the like fitted thereto for use.

The foregoing and other features of the invention are given practical application in various embodiments the subject of the following description, in which reference is made to the accompanying drawings.

In these drawings:

Figure 1 is a semi-diagrammatic or schematic perspective lay-out view of a complete installation of sanitary apparatus according to the invention in connection with a common flushing bowl;

Figure 2 is an illustration of one form of fitting such as may be used with the socket arrangement of Fig. 3;

Figs. 2a and 2b are views of other typical fittings which may be used in place of the fitting shown in Fig. 2, and Figs. 2c and 2d are views showing two forms of nozzle for selective engagement with any of the above named fittings;

Figure 3 is an elevation of a bowl seat in the raised position showing an alternative construction of socket fitting to that shown in position in the bowl in Figure 1, one of the fittings of Figure 2 being also shown to illustrate the manner in which such a fitting may be applied to the socket for use when the seat has been lowered;

Figure 4 is an illustration of generally similar kind to Figure 1 but showing the pan-associated components in a squat-pan application of the invention;

Figure 5 is a perspective view of a bed-pan fitted with a socket device to be fed with water in similar fashion to the bowl or the pan of the earlier figures;

Figure 6 is a larger-scale view of the socket device shown in Figure 5;

Figure 7 is a semi-diagrammatic perspective view of an application of the invention to a trolley structure from which bed-pans, commodes and the like may be served with water; and Figure 8 is a perspective view of a typical convenient construction of cabinet, showing internal parts and how loose equipment may be stored.

The apparatus embodying the invention in the manner shown in Figure 1 comprises a water-supply pipe 1 leading via any convenient path from a supply vessel 2 through a control valve 3 to the rear upper region of the pedestal P and serving a socket or the like 4 suitably provided so as to be directed generally inwardly of or forwardly in the bowl. The member 4 is suitably devised for the ready attachment and removal of suitably configurated and constructed nozzled pipes, hose or the like, forms of which are denoted by references 5, 6, 7 in Figs. 2, 2a and 2b. In Figs. 2c and 2d nozzle parts 8, 9 are shown which are of a known type and may be selectively fitted on the spout end 7a of the flexible pipe 7. Fittings 5 and 6 are each of rigid tubular construction with spray jets at 5a, 6a, 6b and, like the flexible fitting 7, provided with a spigot 4a of complementary form to the socket 4 for easy and effective connection thereto. The construction and arrangement of the socket or the like 4 is preferably such that it provides a rigid support for any suitably configurated non-flexible nozzled pipe fittings such as 5 and 6, correctly to position for use such a fitting with respect to the rim of the bowl or the underside of the lowered seat 10, suitably to orientate the fitting, e. g. with the spray jets 5a, 6a, 6b upwardly and/or rearwardly directed.

Adverting to Figure 1, the water vessel 2, besides having a gravity discharge connection at 2a with the aforesaid water supply pipe 1, is provided with an inlet pipe 11 connected to the vessel through an inlet control valve at 12, and also via a suitable pipeline 13 to the outlet 14 of a thermostat-controlled mixer valve 15. This last is fed via connections 16 and 17 from hot and cold water supply pipes 18 and 19, there also being provided a pipe 20 connecting the mixer valve outlet 14 and line 11 with the float-controlled inlet at 21 for the supply of water to the customary flushing cistern 22 associated with the pedestal bowl P.

The foregoing provisions enable the water vessel 2, serving the nozzled fitting-receiving and -supporting socket or the like 4 at the rear of the bowl, to be readily charged with water at a temperature suitable for irrigation or other such usage, as determined by the setting of the mixer valve 15, by affording a simple means of disposing, along the pipe 20 from the outlet 14 of the mixer valve, and through the flushing cistern 22, of such mixed water as, owing to the usual delay in hot water delivery from a "hot" pipeline, is below the required raised temperature. Thus, when the apparatus has been first set up for use as shown, i. e. provided with the selected fitting, e. g. 5 in position, the flushing cistern may be operated to empty it of the ordinary cold water therein, whereupon it refills with the sub-temperature partly warmed mixed water from the mixer valve. The valve at 12 controlling the inlet to the supply vessel 2 may then be opened to charge the vessel with the warmed water, then available at the desired temperature, to the required quantity such as can be judged by a suitable depth gauge or the equivalent associated with or marked on the vessel.

In preferred embodiments of the invention, the following more detailed features, or any of them, may be included.

There is provided the cabinet C such as that of which the construction is most clearly shown in Figure 8, it being made up in sheet metal or otherwise for installation on or building into a wall, or otherwise mounting within easy reach of the pedestal seat 10 and providing compartments suitable respectively for receiving and storing various interchangeable nozzled pipes and the like which may be selectively connected as required for use from time to time.

More particularly, the cabinet comprises, say, three compartments in an end one of which, $C_1$, a glass or other suitable transparent jar provides the water vessel 2 aforementioned, in co-operating in the inverted condition with a metal or other mounting base closure 2b comprising inlet and outlet connections. The jar itself as thus mounted has an open top 2c which is accessible by lifting the lid $C_2$ of the cabinet about a suitable hinge and may also if desired be aligned at all times with a suitable opening in the cabinet lid when the latter is closed, means thus being provided for the easy introduction of medicinal or other such substances into the vessel. A scale of capacity measurements is if desired also provided either on the jar as at G or down a margin of a window or like opening $C_3$ provided conveniently in a front corner of the cabinet, through which opening the jar may be inspected and the water level therein readily seen.

The pipe 1 may comprise a length of flexible piping, preferably of the armoured-hose kind, which ends in the cock or valve at 3 having a discharge spigot such as can be pushed into sealing engagement in the entrance to a conduit which may either be moulded in the seat or bowl or formed by a length of pipe suitably fixed therein or to these parts; this conduit running generally across the rear part of the bowl to its centre and turning forwardly below the level of the top of the seat and the rim of the bowl and leading to the socket 4 aforementioned. In the construction shown in Figure 1 the conduit through which the water is supplied to the socket 4 via the valve or cock 3 is itself provided by a further loose item of equipment, dispensing thus with the need of altering or modifying in any way the standard pedestal or seat for furnishing the socket 4 in the required position and orientation.

Such additional item of loose equipment may consist as shown in Figure 1, of a length of hygienically-finished rigid pipe having a cranked or offset intermediate portion 4b provided with the socket or the like 4 at the centre of that portion for receiving the selected nozzle fitting, the pipe when required for use being capable of being hung as shown by its opposite ends across the bowl rim $P_1$ in the rear part thereof and clamped down firmly by its ends on rubber or like buffering sleeves 4c by the seat 10 when the latter is then lowered onto the bowl.

It is not essential in a compact installation that the pipe 1 from the water vessel be flexible and/or that that pipe or the means at its other end providing the conduit or pipe which leads to or provides the socket or the like as 4 be disconnectable from operative position. Thus, in the alternative arrangement shown in Figure 3, the socket 4 is provided in one side of a metal block into which is fixed a straight rigid pipe length 4d including the valve 3 for detachable connection with the flexible pipe 1, the block and pipe 4d forming a single unit which is fixed more or less permanently, as by screwing through lugs at 4e and if desired by one or more other fixing plates not shown, against the underside of the seat 10 somewhat in advance of the hinges thereof, with the valve 3 therefore always arranged in a readily-accessible position at one side of the seat.

The valve 12 for controlling admission of the mixed water into the vessel preferably comprises a valve of the push-on type, or other similar easily operated valve by the use of which it is possible easily to limit the amount of water admitted into the vessel at any time for gravitational flow to the ablutionary nozzles or the like.

Adverting to the mixing valve at 15, this is preferably of a type which is or can be set for normal operation so as to deliver water at a temperature of for example 104°±2° F. It is preferred as shown also to include a filter, see item 15a, in each of the cold and hot water supply pipes to the mixer valve, both the latter and such filter being arranged for ready access at any time. The various pipe connections may follow ordinary plumbing practice, being either exposed outside the surface of the walls or concealed therein. Also the pipe 1 may in some cases be a rigid pipe provided only if necessary with a flexible end section such as will admit of movement adjacent to the control valve 3 either to enable a socket-presenting fitting of the kind shown in Figure 1 to be removed from the bowl, or to enable such a fitting as that shown in Figure 3 to be raised or lowered with the seat 10.

Returning again to the construction of the cabinet, the compartments thereof other than that containing the water vessel 2, may serve various purposes including, for instance, the accommodation of toilet paper, the sides and/or lid providing stowage clips $C_4$ or the like enabling the various loose parts of the equipment to be stowed in some such convenient way as that shown in Figure 8. The cabinet, which requires to be mounted at a sufficient height above the level of the pedestal seat for a gravitational feed under suitable head to the nozzle fitting-receiving socket 4 or the like, may with any necessary adjustments or modifications be installed over, e. g. supported directly upon, the flushing cistern 22. The cabinet may of course be of a modified pattern suitable for building into a cavity in the wall alongside of or behind the pedestal.

Turning now to Figure 4, i. e. where, as in that illustration, a normal pedestal bowl is replaced by a squat-pan 24 set substantially flush into the floor, the socket, union, nipple or the like at 4 which is fed as required from the supply vessel (not shown) is preferably so devised and mounted that it can be moved into the required position as shown with respect to the pan for use, or moved into an inoperative position (see broken lines) when not in use. Thus, for example, the socket or the like may be of somewhat similar construction to that shown in Figure 3, i. e. comprising a block or the like fixed to a rigid metal pipe 4d, having a control valve 3. In this case the valved pipe is connected to the flexible or other water supply pipe 1 via a swivel joint 25 fixed by bracket or like means 25a to a wall or other erection at the rear and to one side of the pan; the arrangement providing for the pipe 4d to be swung horizontally, vertically or in any desired plane from a position with the socket above or extending forwardly over the rear of the pan, for instance to a stowage position in which the socket hole or the like is turned to face the aforesaid wall or the like.

Conveniently, the run of supply pipe 1 to the swivel elbow or the like 25 for the pipe 4d is so arranged that in the operative position of the socket block or the like, the latter may be secured to the normal flushing down-pipe 26, a spring or other suitable clip device being associated with the socket or the like as at 27 for that purpose. A suitable swivel joint consists in an elbow mounted in an upright L-arrangement, swivel-connected to the supply pipe by its upright limb, and having a pintle extending downwardly from the elbow into a boss formation of the wall-fixing bracket 25a.

Also, the aforesaid flushing down-pipe 26 usually affords a ready means of attaching and supporting at the desired height the water supply, mixing and/or accessories-storage vessel/s, cabinet or receptacle/s such as may conform at least generally with the foregoing description.

In the case of a commode, the foregoing description with reference to Figure 1 is generally applicable, i. e. the fittings-socket or the like 4 may be fixed or removable with respect to the seat or bowl; and it is most convenient to use a flexible water-supply pipe 1 in order to allow of variation of the distance between the commode and the water-supply vessel.

In the case of a bed-pan 28 (see Figures 5 and 6), the socket block or the like 4 is associated with a clip device, by which it may be temporarily yet securely fixed in the desired arrangement to a suitably selected rim or edge region of the bed-pan and readily removed therefrom, e. g. while remaining connected with the supply pipe 1, to enable the bed-pan to be withdrawn in the usual way after use. Thus, a socket member 4 may preferably be attached, as most clearly shown in Figure 6, in suitable orientation with a strong spring clip 29, jaws 29a of which are suitably shaped and prepared secured to grip the open or unrimmed end of the pan, the pipe 1 in this case being flexible throughout its length, in some cases also at 4d between the suitably located control valve 3 and the socket member.

For such applications of the invention as have just been outlined and wherein the distance between the supply vessel and the nozzle fitting-receiving socket or like 4 is not fixed, it is desirable, if not essential in practice, that the water supply vessel 2 and associated flexible supply pipe 1 and other equipment be fully mobile, e. g. mounted on a wheeled trolley or truck structure for positioning conveniently adjacent to the commode or to the bed and for movement from one bed or room to another; and accordingly it is a further feature of the present invention so to mount such supply vessel and other equipment as that which is elsewhere described as being conveniently attached or built in a more or less permanent fashion at suitable height to a wall in the near vicinity of a fixed pedestal or squat-pan.

As an example of the mobile arrangement of the water supply equipment, such may comprise, as a complete unit which can be borne, in an arrangement such as that shown in Figure 7, on a more or less conventional hospital trolley or wagon 30, a cold water supply tank 31 (taking the place of the usual fixed flushing cistern), an electrically heated geyser or the like 32, a suitable pipe system connecting the tank and the geyser or the like with the mixing valve 15, and generally all other necessary or desirable devices including the length of flexible supply pipe 1 for connection with and serving those parts of the apparatus which occur or are fitted, as required, in or to the commode or bed-pan; whereby the mobile or portable embodiments of this invention may be equally effective and convenient in use to those already described for use in connection with fixed flushing pedestals and the like.

In such a mobile arrangement of the apparatus, the cold and hot water vessels 31 and 32, having necessarily to be mounted in an elevated position with respect to the mixing valve 15 and the vessel 2 for gravitational feed, they may require to be of a somewhat limited capacity. For this reason, therefore, the trolley or the like may be provided in a lower part with a relatively large reservoir tank (not shown) for cold water, and provision included for pumping water electrically or otherwise from the reservoir into the respective elevated vessels to maintain a satisfactory level therein, preferably under the control of float-actuated or like valve means.

We claim:
1. Sanitation equipment for a toilet receptacle which includes a seat defining an opening, a conduit extending to the rear region of the seat, a nozzle fitting detachably connected to said conduit, a manually controlled valve in the conduit at a readily accessible position adjacent the seat, an elevated vessel containing a supply of sanitation liquid, a flexible conduit assembly to conduct liquid from the vessel to the first named conduit, separate sources of hot and cold water, a thermostatically controlled mixer valve to which the sources feed, a conduit leading from the mixer valve to the vessel, and a manually controlled valve in the last named conduit.

2. Equipment, as in claim 1, in which the seat is hinged at its rear end for up and down swinging movement, and a socket member to receive the rear end of the nozzle fitting mounted on the under face of the seat at a position between the hinged end of the seat and the rear of the seat opening for ready accessibility when the seat is in an upwardly swung inoperative position; the first named conduit being connected to and projecting from said socket member.

3. Sanitation equipment, as in claim 1, in which the vessel comprises a transparent open-topped container having a passage in its bottom end, a cabinet in which the vessel is seated, means connecting said second valve at its upper end and the vessel passage in fluid tight relation, the lower end of the valve being connected to the conduit leading from the mixer valve, graduations on one side of the vessel, and a window in the cabinet in which the graduated region of the vessel is exposed when the latter is mounted within the cabinet.

4. Sanitation equipment for a toilet structure which includes a toilet bowl, a seat hinged at its rear end in connection with the bowl and having an opening to register with the bowl, and a float-controlled water inlet flush tank; said equipment comprising an elevated vessel to contain a supply of sanitation liquid, a conduit assembly to conduct liquid from the vessel to a point adjacent the bowl, a liquid dispensing nozzle and conduit unit arranged for operative connection to the assembly at said point and which conduit unit is provided with a socket for receiving the nozzle at a position on the under face of the seat between the hinged end of said seat and the opening therein, a manually controlled valve in said assembly, a thermostatically controlled mixing valve arranged for connection to separate sources of hot and cold water, a pipe leading from the mixing valve to the inlet of the flush tank, another pipe leading from the first named pipe intermediate its ends to the vessel, and manually controlled valve means in the last named pipe.

References Cited in the file of this patent
UNITED STATES PATENTS

| | | |
|---|---|---|
| 233,864 | King | Nov. 2, 1880 |
| 663,826 | Baker | Dec. 11, 1900 |
| 1,091,499 | Friedman | Mar. 31, 1914 |
| 2,705,495 | Vrana et al. | Apr. 5, 1955 |